Figure 1:
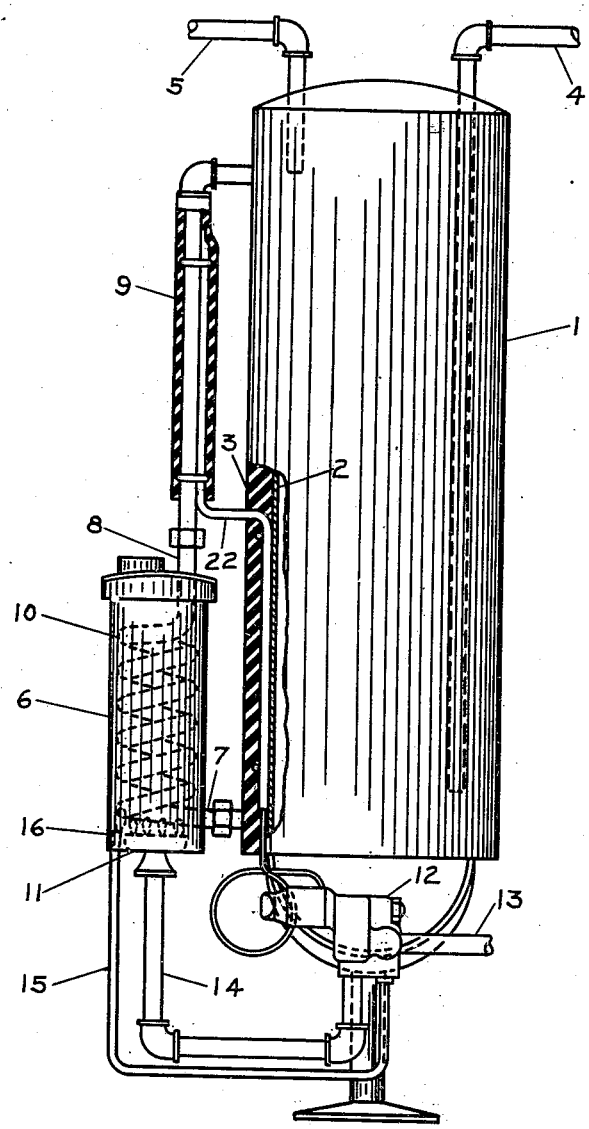

Oct. 15, 1940.   R. E. NEWELL   2,218,341
WATER HEATING SYSTEM
Filed March 4, 1938   2 Sheets-Sheet 2

Inventor
ROBERT E. NEWELL
By John R. Shipman
Attorney

Patented Oct. 15, 1940

2,218,341

UNITED STATES PATENT OFFICE 2,218,341

WATER HEATING SYSTEM

Robert E. Newell, Irwin, Pa., assignor to Robertshaw Thermostat Company, Youngwood, Pa., a corporation of Pennsylvania Application March 4, 1938, Serial No. 193,895

9 Claims. (Cl. 236—20)

This invention relates to a water heating system employing a side arm type of heater and more particularly to a thermostatic control therefor.

The usual side arm type of heater, as at present known to the water heating art, comprises a storage tank and a heater proper mounted alongside the tank with a circulating pipe leading from the lower end of the tank to the heater proper and a return line for carrying the water from the heater to the upper portion of the tank. Water is supplied to the tank through an inlet near the bottom and discharged through an outlet at the top.

In the past, the thermostats for controlling the flow of fuel to the heater burner, have taken many forms in various locations. Probably the most popular form of thermostat has been the rod and tube type inserted in the upper, the lower, or the middle portion of the tank. Regardless of the type of thermostat, in a system having a thermostat responsive to the temperature at either of these positions or at any of the less popular positions, such as in the circulating pipe before or after the water passes through the heater, certain undesirable results have been obtained.

When the thermostat is set at the temperature desired and is responsive to the temperature of the water in the lower portion of the tank or in the circulating pipe leading to the heater, the water in the upper portion becomes too hot for usual domestic uses before the lower portion gets hot enough to shut off the fuel. If the thermostat is set to a temperature below that desired, the upper water will not be overheated but, of course, the lower water will not reach the desired temperature.

When the thermostat is responsive to the temperature of the upper part of the tank, the fuel is shut off before a full tank of hot water is obtained. Further, considerable hot water has to be withdrawn before the thermostat will act to turn on the burner again. In some present day installations, the return line from the heater to the tank has been extended to discharge the hot water into the lower portion of the tank. It is then necessary to heat up the entire tank full of water before any hot water can be obtained.

When the thermostat is responsive to the temperature of the middle of the tank, some of the difficulties of both the upper and lower locations are encountered. And if the thermostat is placed on the return line from the heater, the fuel is turned off and on with great frequency because of the rapid changes in temperature, both in heating and cooling. Consequently, it takes too long to obtain a tank full of hot water.

The foregoing discussion of the water heater control art is presented to more clearly set forth the object of the present invention. This object is to provide a thermostatic control for a side arm water heater which eliminates the aforementioned undesirable features. It is, therefore, proposed to provide a control which will (a) allow a full tank of hot water to be obtained, (b) provide some hot water quickly, (c) open the fuel line when a comparatively small percentage of hot water is withdrawn, and (d) prevent over heating of the water in the upper portion of the tank. The proposed control also provides comparatively quick heating of the entire tank full of water and a close temperature range.

In accordance with the present invention, the stated object is accomplished by rendering the thermostat responsive to the temperatures of both the return line from the heater to the tank and also the lower portion of the tank. The specific manner in which this is achieved is set forth in detail hereinafter with reference to the accompanying drawings.

Figure 2:
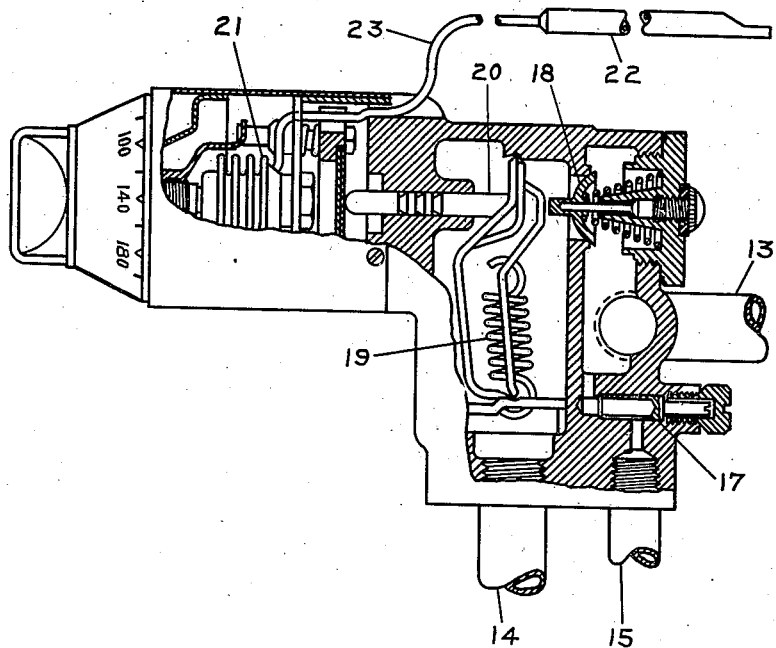

In the drawings:

Figure 1 is an elevation of a portion of a water heating system including the thermostatic control; and Figure 2 is a sectional view of the control itself.

As shown in the drawings, the storage tank is indicated generally by the number 1 and consists of a vertical metal tank 2 and a layer of insulation 3. Cold water is to be supplied through pipe 4 which extends downwardly through the tank to discharge the water near the bottom thereof. Hot water is to be withdrawn from the tank through outlet pipe 5.

A circulating unit is mounted alongside the tank and consists of a heater 6 which includes a series of vertical, water containing coils 10 beside the lower portion of said tank, a short pipe 7 for conducting water from the tank to the lower end of the coils, and a riser or return line pipe 8 extending from the coils substantially vertically and thence horizontally to connect to the upper portion of said tank. A large part of the riser is covered by a layer of insulation 9.

A gas burner 11 is positioned to heat the coils 10. The flow of gas to the burner is controlled by the thermostatic control 12 to which gas is supplied through pipe 13. Gas flows to the burner from the control through pipe 14 and a pilot line 15 leads from the control to the pilot burner 16 adjacent the burner 11.

The control 12 includes a manually adjustable pilot valve 17 and a main valve 18. The main valve is adapted to be operated by a snap acting mechanism 19 which is comprised of a system of levers and a spring as disclosed in the United States Patent No. 2,006,930 issued to Newell and Drylie. The snap mechanism is operated by a gland pin 20 which is actuated by a bellows assembly approximately the same as that described in United States Patent No. 1,998,818 isued to Newell, Robertshaw and Mackintosh.

The bellows assembly includes an expansible and contractible bellows 21 which is connected to a bulb 22 by a capillary tube 23. The bulb, tube and bellows are filled with a thermally-responsive fluid so that a decrease in the temperature of the bulb will cause the fluid to contract and thus allow the bellows to contract to effect a snap opening of the main valve. A rise in bulb temperature will result in a snap closing of the main valve.

As shown in Figure 1, the bulb 22 is comparatively long and approximately one-half thereof is positioned vertically on the lower portion of the tank between the insulation and the metal container and the other half is positioned on the riser pipe beneath the insulation thereon. Thus the thermostatic control is made responsive to the temperatures of both the riser and the lower portion of the tank. By using a vertical tank and vertical coils and riser in the relative positions shown, it is possible to use a single bulb to cause operation of the valve in accordance with the combined effect of the two temperatures on the thermally-responsive fluid.

It is easy to understand that with a different amount of insulation on the riser, a different capacity burner, or other changes in design, slightly different proportions may be desirable in positioning part of the bulb on the tank and part on the riser. Although a snap acting valve is shown and described in view of the well-known advantages obtainable with such a valve, the operation and effect of the control will be substantially the same with a throttling valve.

The operation is as follows: starting with a system full of cold water, the water in the coils is heated and the hot water passes through the riser or return pipe into the top of the tank. The water in the riser is not hot enough to shut off the valve since one half of the bulb is against the cold lower portion of the tank. As the hot water rises, cold water passes through pipe 7 into the coils to be heated and discharged into the top of the tank. Thus some hot water is available for withdrawal through pipe 5 soon after the heater is started.

As the heating continues, the water in the lower portion of the tank will gradually become heated causing the lower half of the bulb to be heated slightly. Then, as the water entering the coils is warmer than before, the water passing through the riser will be correspondingly hotter causing the temperature of the upper half of the bulb to be increased also. As a result of the total or combined temperature increase of both parts of the bulb, the valve will be operated to shut off the gas burner.

Since the riser contains only a small quantity of water, it cools very rapidly. The lower portion of the tank is not yet hot, and therefore the cooling of the riser will cause the valve to be opened to supply gas to the heating burner. As the riser is comparatively cool, it takes several minutes for the hot water passing through the riser to heat the pipe and for the pipe to heat the bulb and the fluid therein. Moreover, the lower half of the bulb is merely warm, requiring a rather high temperature in the riser to shut off the burner. During this time an appreciable quantity of hot water is discharged into the top of the tank. However, before the temperature in the upper portion is raised too high, the gas burner will be shut off.

When the burner is off, the water in the tank will tend to equalize in temperature. Thus, when the burner is again turned on, the temperature of the upper portion of the tank will be slightly lower than before to prevent overheating when the newly heated hot water is added thereto. Further, the bottom of the tank is a little warmer than before requiring the riser to cool to a lower temperature to open the valve. The cycle is repeated and each time the bottom of the tank gets warmer, requiring the riser to get cooler in order to start the burner again. Further, as the water in the tank becomes warmer, more of its heat becomes available for conduction into the riser retarding the cooling. Thus it is apparent that as the tank gets warmer, the time interval between heating operations becomes greater. Finally, when the entire tank full of water is hot, the valve will remain shut for a long period.

When hot water is withdrawn through pipe 5, cold water enters through pipe 4 and is discharged near the bottom of the tank. As mentioned hereinbefore, the valve is controlled by the combined temperatures of the riser and the lower part of the tank, and because of the cooling of the riser, the lower part of the tank must be hot to keep the valve closed. Consequently, only a relatively small quantity of cold water added to the lower part of the tank is necessary to cause the valve to be opened. For example, in using a thirty gallon tank, it has been found practical to make a control in which the valve will immediately open upon the withdrawal of about three gallons of water. Thus the burner will not operate every time the hot water faucet is opened but it will operate as soon as ten per cent of the hot water is withdrawn.

It is to be noted that in the system described, the heating operations occur at regular intervals until a full tank of hot water is obtained; some hot water will be available shortly after the heater is started; only a small percentage of hot water must be withdrawn to start the heater; and overheating of the water in the upper portion of the tank is prevented. In addition, the usual desirable features of automatic water heater control are obtained.

It is to be further noted that having the bulb against the riser not only prevents overheating of the water in the upper part of the tank but also limits the temperature of the water in the riser. This is especially important when the heater is used with water containing lime. If the water passing through the heating coils and the riser is overheated, the lime will be deposited on the walls of the circulating unit and tank. Naturally, the lime deposits will shorten the life of the unit and tank.

It will be easily understood that certain variations may be made in the preferred embodiment which has been disclosed herein without affecting the principle of operation. For example, two heat sensitive members might be used instead of one. Further, the location of the heat sensitive member might be altered slightly, so as to make the thermostat responsive to the temperature of pipes 9 and 7 instead of pipe 9 and the lower portion of the tank. In both cases the thermostat is subject to the temperature of the circulating water both before and after heating by the burner and the operation remains substantially the same. Other embodiments may be provided within the scope of the appended claims.

I claim:

1. In a water heating system including a storage tank, a heater, a pipe for conducting water from said tank to said heater, a return pipe connecting said heater and said tank, a burner for heating the water in said heater, a fuel supply line therefor, and a thermostatic control responsive to the temperature of the water in the lower portion of said tank and to the temperature of the water in the return pipe before it is returned to and mixed with the water in the tank for controlling the flow of fuel through said line.

2. In a water heating system including a storage tank, a heater, a pipe for conducting water from said tank to said heater, a return pipe connecting said heater and tank, a burner for heating the water in said heater, a fuel supply line therefor, a valve in said line, and thermostatic means for operating said valve including a single heat-sensitive member positioned to be responsive to the temperature of the water in the lower portion of said tank and to the temperature of the water in the return pipe before it is returned to and mixed with the water in the tank.

3. In a water heating system including a storage tank, a heater, a pipe for conducting water from said tank to said heater, a return pipe connecting said heater and tank, a burner for heating the water in said heater, a fuel supply line for said burner, and a thermostatic control comprising a valve in the fuel line, a bellows operatively connected with said valve, a bulb positioned partly against the lower portion of said tank and partly against the return pipe and a capillary tube connecting said bulb and bellows, said bulb, bellows and tube being filled with a thermally-responsive fluid to effect movement of said bellows in accordance with the combined temperatures of the return pipe and the lower portion of said tank.

4. In a water heating system including a storage tank, a heater, a pipe for conducting water from said tank to said heater, a return pipe connecting said heater and tank, a burner for heating the water in said heater, a fuel supply line for said burner, and a thermostatic control comprising a valve in said fuel line, a bellows operatively connected with the valve, means directly connected with the bellows to form therewith a closed fluid container and a thermally-responsive fluid therein to actuate said bellows, said means being arranged and positioned to subject the major portion of said fluid to two temperatures in the system, some of the fluid being subject to the temperature of the lower portion of the tank and some to the temperature of the return pipe, whereby the bellows will be actuated in accordance with the combined effect of the two temperatures on the fluid.

5. In a water heating system including a vertically mounted storage tank having a cold water inlet and a hot water outlet, a series of heater coils mounted vertically alongside the lower portion of said tank, a pipe for conducting water from the lower portion of said tank to the lower end of said coils, a return pipe extending from said coils substantially vertically and thence horizontally to connect to the upper portion of said tank, said return pipe and said tank each having a layer of insulation therearound, a burner for heating said coils, a fuel supply line therefor, and a thermostatic control comprising a valve in said fuel line, a bellow operatively connected with said valve, a bulb positioned with a part thereof vertically beneath the insulation and against the lower portion of said tank and another part against the return pipe beneath its insulation and a capillary tube connecting said bulb and bellows, said bulb, bellows and tube being filled with a thermally-responsive fluid, whereby a single bulb effects movement of said bellows in accordance with the combined temperatures of the lower portion of said tank and the return pipe.

6. In a water heating system, the combination of a storage tank, a heater, a pipe for conducting water from the tank to the heater, a return pipe for conducting water from the heater to the tank, and a thermostatic control unit responsive to the temperature of the water in the lower portion of the tank and to the temperature of the water in the return pipe for controlling the operation of the heater.

7. In a water heating system, the combination of a storage tank, a heater, a pipe for conducting water from the tank to the heater, a return pipe for conducting water from the heater to the tank, and a thermostatic control unit comprising a bellows for controlling the operation of the heater, a bulb responsive to the temperature of the water in the lower portion of the tank and to the temperature of the water after it is heated by the heater and before it is returned to the tank through the return pipe, a tube connecting the bulb and bellows, and a thermally responsive liquid in said bulb, tube and bellows.

8. In a water heating system, the combination of a storage tank, a heater, a pipe for conducting water from the tank to the heater, a return pipe for conducting water from the heater to the tank and a thermostatic control unit responsive to the temperature of the water entering the heater and to the temperature of the water in the return pipe for controlling the operation of the heater.

9. In a water heating system, the combination of a storage tank, a circulating unit having connections with the tank to permit a constant flow from the tank through the unit and back to the tank, a burner for heating the water passing through the unit, a fuel supply line connected with the burner, a control valve in the line, and a thermostatic control element including a bellows operatively connected to the valve and means responsive to the temperatures prevailing in the lower portion of the tank and the temperature of the return pipe cooperating with the bellows to control the supply of fuel to the burner.

ROBERT E. NEWELL.